United States Patent Office 3,391,188
Patented July 2, 1968

3,391,188
POLYOLATE-PACM CO-ORDINATION COMPOUNDS AND PREPARATION THEREOF
Wilfred J. Arthur, Charleston, W. Va., assignor to E. I. du Pont de Nemours and Company, Wilmington, Del., a corporation of Delaware
No Drawing. Filed Oct. 26, 1964, Ser. No. 406,567
33 Claims. (Cl. 260—563)

ABSTRACT OF THE DISCLOSURE

Alcoholate reaction products of bis(p-aminocyclohexyl)methane and organic polyols are formed by mixing the reactants such as the stereoisomers of bis(p-aminocyclohexyl)methane and a polyol such as ethylene glycol and recovering the solid polyolate product. Formation of the polyolates provides an efficient method for separating the stereoisomers of bis(p-aminocyclohexyl)methane.

This invention relates to bis(p-aminocyclohexyl)methane. More particularly it is directed to the polyolate reaction products of bis(p-aminocyclohexyl)methane and an organic polyol and to the use of these polyolate reaction products in the separation of the isomers of bis(p-aminocyclohexyl)methane.

Bis(p-aminocyclohexyl)methane, hereinafter referred to as PACM, is known to exist in three stereoisomeric forms. These stereoisomers exist because of the relative configuration of the two pendant amine groups and the methylene group bridging the two cyclohexyl moieties. The three stereoisomers are designated by common terminology the cis,cis, the cis,trans, and the trans,trans isomers.

As is often true of stereoisomers, these isomers sometimes differ in physical properties such as melting points. In order to obtain a particularly desired property it is often necessary to separate the stereoisomers or at least to concentrate one or more isomers at the expense of the concentration of the other isomers or isomer.

Various techniques are known for isolating or enriching the stereoisomers of PACM. Kirk et al., U.S. Patent No. 2,494,563, describes several techniques such as crystallization from solvents, preparation and isolation of derivatives, and fractional crystallization in the absence of a solvent.

Crystallization, with or without a solvent, is disadvantageous in that the solubility of the three isomers is similar and crystallization is difficult to achieve. A high degree of concentration of one isomer may require many recrystallizations. The formation of chemical derivatives gives a more positive crystallization scheme but has the disadvantage of usually requiring at least one reaction step and one or more subsequent chemical steps to regenerate the diamine after separation.

I have discovered that PACM coordinates with compounds containing two or more hydroxyl or thiol groups on aliphatic carbons, to form what I call polyolates. The formation and chemical structure of these compounds is not completely understood but their existence is readily ascertainable as will be more fully exemplified hereinafter.

The term polyolate as used to describe the reaction products of this invention means a polyol in association with PACM by means of coordinate covalent bonds such as is commonly known in the chemistry of hydrates. The molecule of PACM and the molecule of the polyol are coordinated in a manner similar to water of hydration, with the polyol corresponding to the water.

These polyolate reaction products are extremely useful in separating the stereoisomers of PACM. The polyolate reaction products have different solubilities one from the other and markedly different solubilities than the stereoisomers of PACM themselves. By converting a stereoisomer fraction such as the trans,trans isomer fraction to the corresponding polyolate in a mixture of PACM stereoisomers a crystallization occurs which permits the separation of the trans,trans stereoisomer from the other two isomers. Using this method a mixture of the stereoisomers of PACM can be reduced in trans,trans isomer content to 1% or lower.

Additionally, the polyolate can if desired be decomposed back into its component parts such as glycol and trans,trans PACM by simply subjecting the polyolate to fractional distillation under either atmospheric or reduced pressure. Under these conditions the glycol will boil off at its pure component point and the diamine at its pure component point. This technique, utilizing the polyolates of this invention, provides an easy, effective and inexpensive method for separating or concentrating the isomers of PACM.

STARTING MATERIALS

The PACM starting material can be prepared by any suitable means. Satisfactory methods are described, for example, in Kirk et al., U.S. Patent No. 2,494,563 issued Jan. 17, 1950; Whitman, U.S. Patent No. 2,606,925 issued Aug. 12, 1952; and Barkdoll et al., U.S. Patent No. 2,606,928 issued Aug. 12, 1952.

Suitable polyols can be obtained commercially or can be prepared by methods well known in the art. It is believed that all organic compounds which have multiple OH or SH groups on aliphatic carbons and contain no constituent groups that are more reactive with PACM than the OH or SH groups will associate with PACM to form the polyolate reaction products of this invention. By use of the term "aliphatic carbon" it is meant to exclude only such compounds which do not contain multiple OH or SH groups on non-aromatic carbon atoms.

Alternatively, the polyols suitable for use in this invention can be described as organic compounds containing two or more —XH groups on aliphatic carbon atoms where X is a chalcogen having an atomic number less than 34, and containing no other substituents which will react with the amine groups of PACM preferentially to the —XH groups.

Polyhydroxyl compounds which have been found satisfactory in forming readily separable polyolates with the trans,trans isomer of PACM are as follows: ethylene glycol; 1,3-propanediol; 1,3-butanediol; 1,2-propanediol; glycerol; 3-chloropropanediol-1,2; 2-methyl propanediol-1,2; diethylene glycol; dipropylene glycol; triethylene glycol; 1,2-butanediol; 2,3-butanediol; 1,4-butanediol; 2-methyl-pentanediol-2,3; 4-methyl-pentanediol-1,2; 3-methoxypropanediol-1,2; diethanolamine; 1,2-pentanediol; 1,5-pentanediol; 2,3-pentanediol; 2,2-dimethyl propanediol-1,3; 1,2-hexanediol; 1,2,5,6-hexanetetrol; 1,6-hexanediol; 4-methyl pentanediol-1,2; 2-methyl pentanediol-1,2; 4-methyl pentanediol-2,3; 1,2,3-trishydroxymethyl propane; 1,3-cyclohexanediol; 1,2-heptanediol; 5-methyl hexanediol-1,2; 1,2-octanediol; 2,3-octanediol; 3,4-octanediol; 4,5-octanediol; 1,2,7,8-octanetetrol; 1,2-decanediol; 1,10-decanediol; 1,2-dodecanediol; phenylethyleneglycol; 1-2-bis(hydroxymethyl)cyclohexane; 1,3 - bis(hydroxymethyl)cyclohexane; 1,4-bis(hydroxymethyl)cyclohexane; 2,3-dihydroxy dioxane; and cis or trans 4,4'-bis(hydroxymethyl)dicyclohexyl.

Polyols containing one or more thiol groups which have been found to form separable polyolates with the trans, trans isomer of PACM include 2-mercaptoethanol, trans-2-mercaptocyclohexanol, ethanedithiol-1,2, and 3-mercaptopropanediol-1,2.

REACTION CONDITIONS

The preparation of the polyolates and subsequent separation of polyolates from remaining stereoisomers can conveniently be accomplished as will now be described.

The preparation of the polyolates is accomplished by bringing together in a suitable vessel a quantity of PACM with a stoichiometric amount of one of the previously described polyols. A mixing of the reactants results in the formation of the polyolate.

The reaction is mildly exothermic and reaction temperatures are not critical. If the reaction is conducted at atmospheric pressure, it is desirable to maintain a temperature above the freezing point of the reactants and below their normal boiling points. To avoid necessity for costly equipment the reaction will preferably be carried out between about −25° C. and 100° C., and for ease of handleability the reaction will most preferably be conducted between 15° and 75° C.

The amount of polyol used is not critical but will be determined by the results sought to be obtained. Ordinarily one mole of polyol will be used for each mole of PACM with which reaction is desired. For example, if a mixture of the three isomers is to be separated with a polyol by forming a polyolate of the trans,trans isomer, the polyol will be used in amounts sufficient to combine with the trans,trans isomer only.

Amounts of polyol in excess of stoichiometric ordinarily create no problem other than removal of the excess reactant at the completion of the reaction. Amounts which are less than stoichiometric merely result in some PACM remaining after completion of the reaction.

When a mixture of isomers is used the polyol will ordinarily combine, on a preferential basis, first with the trans,trans isomer, second with the cis,cis isomer and last with the cis,trans isomer. If a mixture of the isomer polyolates is formed their separation is ordinarily on the same order with the trans,trans isomer polyolate crystallizing first and so on.

The crystallization of the polyolates is accomplished by methods well known in the art, with simple cooling, agitation, or seeding being used as desirable.

Separation of the crystallized polyolate can also be accomplished by methods well known in the art, such as filtration, centrifugation, or concentration by decantation.

If desired the reaction can be conducted in the presence of an inert organic diluent. It appears that most of the trans,trans isomer polyolate which dissolves during the reaction is dissolved in the other PACM isomers or their polyolates. Addition of an inert organic diluent can be used to advantage by decreasing the solubility of a polyolate, such as the trans,trans isomer polyolate, in the other PACM isomers or their polyolates.

A diluent if used can be admixed with the reactants in any order. The amount of diluent used can range from trace amounts up to many times the volume of the other reactants. For reasons of convenience and economy the diluent will normally be used in amounts ranging from 1 to 7 times the volume of the PACM used, with the optimum recoveries obtainable at amounts of about 4 times the volume of PACM used.

In view of its purpose the diluent should be selected on the basis that the reactants dissolve in it while the polyolate reaction product is readily separable from it such as by crystallization of the polyolate followed by filtration, centrifugation or decantation. It is also desirable that the diluent be one which can be removed by distillation or evaporation.

As will be obvious to one skilled in the art the choice of such a diluent would also be made on the basis that it is nonreactive with the starting materials and the reaction product. For example, such classes of compounds as organic acids and organics containing active halogens are not considered "inert" organic diluents for the purposes of this invention. Classes of compounds which have been found valuable as inert diluents include ethers, aromatic hydrocarbons, straight and branch-chained aliphatic hydrocarbons, ether alcohols, substituted amines, nitriles, ketals, alcohols, aliphatic and aromatic amines, stable chlorine containing hydrocarbons, and stable fluorinated aromatics. Combinations of such inert diluents can also be used if desired.

One skilled in the art will further recognize that the choice of a particular diluent is in part a function of the polyol to be used. And, while general rules regarding the solubility of like materials in like solvents and the converse exist, no good theoretical criteria for the optimum choice of solvents in crystallization have as yet been devised. As a result it is generally recognized that the choice of an optimum solvent is always a matter of trial and error experimentation and much the same is true of the inert organic diluents to be used in this invention.

Particular diluents which have been found useful are those such as di-n-butyl ether, diisopropyl ether, cyclohexane, toluene, di-n-propyl ether, diallyl ether, benzene, xylene, n-hexane, cyclooctane, tributylamine, isopropoxypropionitrile, pentanol - 2,2(2 - ethoxyethoxy) - ethanol, tetrahydrofuran, tetrahydropyran, diethyl ether, tetramethylene sulfone, dimethylsulfoxide, pyridine, N-methylaniline, quinoline, isobutylamine, diisopropylamine, hexahydroazepine, cyclohexylamine, diphenylmethane, isooctane, fluorobenzene, nitromethane, nitrobenzene, adiponitrile, acetonitrile, dioxane, 1,2-diethoxyethane, 1,2-dimethoxyethane, diphenyl ether, dicyclohexyl ether, carbon tetrachloride, undecane, and 2,3,4-trimethyl-1,5-dioxaspiro(5.5)undecane.

Of these diluents, di-n-propyl ether, diallyl ether, benzene, xylene, n-hexane, cyclooctane, 1,2-diethoxyethane and tributylamine are preferred because of the marked improvement their presence contributes to the crystallization of the polyolates.

The most preferred diluents because of the ease of handleability and highest polyolate recoveries are di-n-butyl ether, diisopropyl ether, cyclohexane, and toluene.

Generally speaking, the selection of the polyol to be used in forming the polyolate reaction product of this invention is similar to the selection of a diluent. As previously mentioned, the polyol should contain no substituent groups which are more reactive with PACM than are the OH or SH groups. The polyol is chosen on the basis of the melting point of the polyolate it will form and the advantages attendant to a good crystal habit of that polyolate.

The melting point and crystal habit of the polyolate to a large measure determine the ease and effectiveness of recovery of that polyolate by crystallization and filtration, centrifugation, or decantation.

Generally 1,4-butanediol, 3-methoxy propanediol-1,2, 1,2-pentanediol, 2,3-pentanediol, 2,3-octanediol, 3,4-octanediol, and 4,5-octanediol, are preferred polyols because the solubilities of their polyolates in either the remaining unpolyolated PACM stereoisomers or the remaining unpolyolated PACM stereoisomers plus the diluent if used, is low and their crystal habit is such as to give a firm, more easily filterable crystal.

The most preferred polyols are ethylene glycol, 1,2-propanediol, 1,2-butanediol, and 2,3-butanediol. These polyols convert the trans,trans isomer of PACM to the insoluble polyolate in the highest yields, crystallize most readily and are most easily separated.

REACTION PRODUCTS

As has been stated previously, the exact formation and chemical structure of the polyolate reaction products of this invention are not completely understood. However, that the reaction products exist as new chemical entities, distinct from the reactants, can be demonstrated.

For example, I have found that whereas ethylene glycol is a liquid at room temperature and the trans,trans isomer of PACM melts at 64.5° C., an equal molar combination of these two compounds melts at 88° C. The melting point is sharp and distinct as is characteristic of a chemical entity. The presence of more than a stoichiometric amount of glycol or trans,trans PACM in the preparation of this polyolate results in a melting point lowering as would be expected of a mixture of two organic compounds. Similar melting point differences can be shown in the formation of the trans,trans PACM-propylene glycolate which melts at 87° C., the trans,trans PACM-3-methoxy propane-1,2-diolate which melts at 82° C., the trans,trans PACM-1,2-butanediolate which melts at 68° C., the trans,trans PACM-2,3-pentanediolate which melts at 81° C., the trans,trans PACM 2,3-octanediolate which melts at 97° C., and many others.

Moreover, the polyolates of the trans,trans PACM, as well as the cis,trans and cis,cis PACM are further demonstrated to be molecular entities through their Nuclear Magnetic Resonance spectra. The NMR indicates the formation of coordinate covalent bonding through the OH or SH groups as previously described, similar to the formation of hydrates.

X-ray examination of the polyolate crystals reflect the following strongest peaks in their crystal diffraction pattern in descending order:

trans,trans PACM-ethanediolate, 4.84A, 7.19A, 4.04A; trans,trans PACM-1,2-propanediolate, 7.37A, 4.74A, 5.12A, 4.92A, 3.10A; trans,trans PACM-2-methyl-1,2-propanediolate, 4.87A, 4.79A, 5.06A, 7.37A, 4.04A, 2.90A; trans,trans PACM-1,2-butanediolate, 7.49A, 4.84A, 4.72A, 5.01A, 5.15A, 4.50A; trans,trans PACM-2,3-butanediolate, 4.84A, 7.49A, 2.95A, 4.09A, 3.75A.

These examples as well as those that follow are for the purpose of further exemplifying the invention and should not be construed as in any way limiting of the invention. The parts and percentages are by weight unless otherwise noted.

Example 1

In a suitable container equipped for mixing of the contents is placed 150 parts of di(n)butyl ether and 50 parts of PACM having a freezing point of 23° C. and consisting of 29% trans,trans, 60% cis,trans, and 11% cis,cis isomers. While stirring, 8.9 parts of ethanediol is added and the mixture is cooled to about 15° C. before making a separation of the solid and liquid via simple filtration. Each phase is fractionally distilled separately to remove ether and glycol and, finally, to take overhead a fraction of PACM boiling at about 150° C. at 3 torr. That PACM obtained from the filtrate shows a freezing point of about 13.4° C. and contains 23% trans,trans, 65% cis,trans, and 12% cis,cis isomers. That PACM obtained from the separated crystal crop has a freezing point of 53° C. and contains 70% trans,trans, 25% cis,trans, and 5% cis,cis isomers.

Example 2

In a container equipped for heating or cooling and arranged for stirring of the contents is placed 100 parts of dibutyl ether and 100 parts of PACM consisting of 23% trans,trans, 66% cis,trans, and 11% cis,cis isomers. With stirring and at a temperature of 35° C., 10 parts of 1,2-propanediol is added, and the mixture is then cooled slowly to 10° C. The well defined crystals are removed by simple filtration and the crystals and filtrate are fractionally distilled separately to recover the contained PACM. After removal of the ether, the crystal crop is found to consist of about 6 parts of propanediol and 37 parts of PACM containing 56% trans,trans, 38% cis,trans, and 6% cis,cis isomer. The filtrate, freed of ether and glycol, contains about 63 parts of PACM having 5% trans,trans, 78% cis,trans, and 17% cis,cis isomers.

Example 3

With efficient stirring, 20 parts of 1,2-propanediol is added to a 35° C. solution of 400 parts of dibutyl ether and 200 parts of a PACM containing 22% of the trans,trans isomer in admixture with the cis,trans and cis,cis isomers. The reactants are cooled to about 15° C. and the resulting crystalline slurry is fed to a small basket centrifuge, which is spun until free mother liquid is no longer discharged. 50 parts of the crystal cake is transferred to a laboratory distillation column and is distilled at 50 torr to recover about 18 parts of dibutyl ether. The ether-free pot material has a freezing point of about 81° C. and contains about 76% PACM isomers as PACM-propylene glycolate. The distillation is continued at 3 torr to obtain 6.6 parts of 1,2-propanediol and 25 parts of PACM containing 87% trans,trans isomer.

Example 4

In a suitable vessel equipped with an agitator is placed 1028 parts of dibutyl ether and 640 parts of PACM consisting of about 12% trans,trans, 72% cis,trans, and 16% cis,cis isomers. At about 30° C. and with agitation, 42 parts of 1,2-propanediol is added and the mixture is cooled to 15° C. The crystalline solids obtained are separated from the mother liquor by simple filtration at 15° C. and are discarded. The filtrate is distilled to remove ether and to recover 575 parts of PACM containing 5% trans,trans, 77% cis,trans, and 18% cis,cis.

Example 5

In a suitable vessel is placed 580 parts of dibutyl ether and 277 parts of PACM containing about 24% trans,trans isomer in admixture with the other isomers. To this is added 43 parts of ethylene glycol, which is admixed by simple swirling of the vessel contents, at about 35° C. The mixture is cooled to about 20° C. and allowed to stand for 16 hours. After simple filtration, the crystals are discarded and the filtrate is distilled to obtain 120 parts of PACM comprised of 2% trans,trans, 81% cis,trans, and 17% cis,cis isomers.

Example 6

Approximately 129 parts of ethylene glycol is injected into a mixture of 1554 parts of dibutyl ether and 870 parts of a PACM containing about 25% trans,trans isomer in admixture with the other isomers, at 30° C. The suddenly formed crystals are allowed to age for about 20 minutes during which time the temperature drifts to about 20° C., and are then filtered from the mother liquor and discarded. Distillation of the filtrate serves to remove the ether and a small "foreshots" fraction, and gives a PACM fraction of 450 parts containing 7% trans,trans in admixture with the other isomers.

Example 7

In a suitable container equipped for stirring the contents is placed a mixture comprising 3 volumes of dibutyl ether to one volume of a PACM containing about 28% trans,trans isomer in admixture with about 60% cis,trans and 12% cis,cis isomer and a 10% excess of ethylene glycol based on 1 mole of glycol per mole of trans,trans PACM. The system is made homogeneous by heating to 60° C. and is then allowed to cool spontaneously and stand for 16 hours prior to simple filtration separation of the crystals from the mother liquor. Distillation recovery of the PACM from the mother liquor gives material with a composition of 6% trans,trans, 78% cis,trans, 16% cis,cis isomers.

Example 8

In the same general manner described in Example 7, but using a ratio by volume of ether to PACM of only 2:1, and allowing only one hour standing for crystal growth, the PACM recovered from the filtrate after removal of the crystalline PACM-ethylene glycolate is shown to contain about 8% trans,trans, 77% cis,trans, and 15% cis,cis isomers.

Example 9

In a suitable container is placed a mixture of 3.5 volumes of dibutyl ether per volume of a PACM of a composition of approximately 9% trans,trans, 76% cis,trans, and 15% cis,cis isomers. A calculated 900% excess of 2,3-butanediol is added, based on one mole of butanediol per mole of trans,trans isomer, at 40° C. The mixture is cooled, finally to 22° C., and held for 2 hours prior to separation of the crystals by simple filtration. Distillation of the filtrate gave PACM with a freezing point of 20.4° C., $n_D^{25}=1.5051$, and comprised of about 4% trans,trans, 80% cis,trans, and 16% cis,cis isomers.

Example 10

A mixture of 927 parts of dibutyl ether and 618 parts of PACM containing about 9% trans,trans mixed with the other isomers is treated with 16.8 parts ethylene glycol and is held at 15° C. for 30 minutes prior to simple filtration separation of the solid crystalline phase from the supernatant liquid. Distillation of the filtrate gives 590 parts of a "Hearts Cut" of PACM containing 7.7% trans,trans isomer mixed with the other isomers.

Example 11

A mixture of 60 parts each of diisopropyl ether and a PACM containing 28% trans,trans in admixture with the other isomers is treated at 30° C. with 9.3 parts of 2,3-octanediol and cooled to 17° C., with stirring before separation of the waxy solid crystalline octanediolate via simple filtration. Distillation removal of the ether and octanediol from the solid crystal cake, which melts at about 87° C., allows recovery of the PACM moiety which is found to contain 63% of the trans, trans isomer.

Example 12

A 45° C. mixture of 70 parts of cyclohexane, 10 parts of 2,3-pentanediol, and 30 parts of a PACM containing 55% of the trans,trans isomer in admixture with the other isomers, begins to form crystals when the dropping temperature reaches 34.8° C. After a short holdup at about 20° C., simple filtration serves to separate the soft, greasy-appearing cake from the supernatant mother liquor. After rinsing with 12–15 parts of cyclohexane, the crystal cake is distilled to give cyclohexane, 6 parts of pentanediol, and 14.5 parts of PACM containing 70% of the trans,trans isomer in admixture with the other isomers. A small portion of the crystal crop shows a melting point of about 80° C. when vacuum dried. It contains 66.9% PACM via acid base titration and one mole of PACM coordinated with one mole of pentanediol requires the presence of 66.9% PACM.

Example 13

A mixture of 200 parts of dibutyl ether and 100 parts of PACM consisting of 28% trans,trans, 60% cis,trans, and 12% cis,cis isomers, is treated with 27 parts of 3-methoxy propanediol-1,2 at about 35° C., and is stirred and cooled to 14° C. in about 35 minutes. The resulting slurry is filtered and the cake rinsed with 30 parts dibutyl ether. 86 parts of wet crystal cake, with a melting point of about 64° C., is distilled to give ether, 16.3 parts of methoxy propanediol, and 33.6 parts of PACM comprised of 70% trans,trans, 26% cis,trans, and 4% cis,cis isomers. The filtrate is distilled to yield a PACM fraction comprised of 1% trans,trans, 82% cis,trans, and 17% cis,cis isomers.

Example 14

A mixture of 200 parts of dibutyl ether and 100 parts of PACM comprised of 28% trans,trans, 60% cis,trans, and 12% cis,cis isomers is treated with 33 parts of 1,2-hexanediol at 30° C. After a short period of stirring, the slurry is found to gel and is subsequently solubilized by heating and addition of 50 parts of dibutyl ether. A first crop of solid material is removed after cooling to 19° C., and the waxy cake is rinsed with 19 parts of dibutyl ether. The filtrate is further cooled to about 11° C., where the coalescing of the gel islands makes mixing very poor, and it is filtered. The crystal cakes are composited to give 50 parts of ether-wet material with a 39° C. melting point. Distillation of this solid phase gives ether, 7.5 parts of hexanediol, and 14.6 parts of PACM with a composition of 87% trans,trans, 11% cis,trans, and 2% cis,cis isomers. The filtrate contains ether and about 79 parts of PACM with a composition of 22% trans,trans, 66% cis,trans, and 12% cis,cis isomers.

Example 15

To a mixture of 5 parts of dibutyl ether with 1 part of PACM having a trans,trans isomer content of about 15%, is added sufficient 2,3-butanediol to approximate saturation of the composite system at 15°–20° C. A small amount of seed crystals of the trans,trans isomer 2,3 butanediolate is added and the mixture is stirred while cooling to about 0° C. The crystal crop is removed by simple filtration and the resulting filtrate is distilled to recover PACM having the composition of 1% trans,trans, 82% cis,trans, 17% cis,cis isomers.

Example 16

A mixture of 250 parts of dibutyl ether and 57 parts of PACM having a trans,trans isomer content of 55% is treated with 22 parts of 2,2'-dipropylene glycol at about 40° C. and is cooled slowly with stirring to 20° C. Removal of the waxy crystals by filtration is followed by a further crystallization of the filtrate to about 15° C. The two crystal crops are rinsed with a small volume of dibutyl ether, and are composited and distilled to give dibutyl ether, 7.4 parts of dipropylene glycol, and 16 parts PACM having the composition 79% trans,trans, 18% cis,trans, and 3% cis,cis isomers.

Example 17

A mixture of 3 volumes of dibutyl ether with one volume of a PACM comprised of 8% trans,trans isomer, 75% cis,trans isomer, 15% cis,cis isomer and including 2% of the 2,4'-bis(aminocyclohexyl)methane is saturated with 2,3-butanediol at about 20° C., then cooled to about 5° C. for 16 hours. The crystals are removed by simple filtration and the resulting mother liquor distilled to give a PACM fraction comprised of 5% trans,trans, 78% cis,trans, 16% cis,cis isomers, and 2% of the 2,4'-bis(aminocyclohexyl)methane.

Example 18

At a temperature of about 45° C. and with efficient mixing, 30 parts of ethylene glycol is added to 105 parts of PACM comprised of 28% trans,trans, 58% cis,trans, 12% cis,cis isomers, and 2% 2,4'-bis(aminocyclohexyl)methane. The mixture is cooled to about 27° C. and held at this temperature for 30 minutes before separation of the fine crystalline solids from the viscous mother liquor via simple pressure filtration. Fractional distillation of the resulting crystal cake yields ethylene glycol and a PACM fraction of 28 parts comprised of 63% trans,trans, 31% cis,trans, and 6% cis,cis isomers.

Example 19

At a temperature of about 40° C. and with efficient mixing, 38 parts of 1,2-propanediol is added to 105 parts of PACM comprised of 28% trans,trans, 58% cis,trans, 12% cis,cis isomers, and 2% 2,4'-bis(aminocyclohexyl)methane. The mixture is cooled to about 27° C. and held for about 45 minutes prior to separation of liquid and solid via pressure filtration. Due to the soft nature of the crystals and the very viscous surrounding liquid, the filtration requires about 2 hours at 27° C., and is poorly efficient. Fractional distillation of the resulting "crystal cake" yields propanediol and 51 parts of PACM comprised of 40% trans,trans, 50% cis,trans, and 10% cis,cis isomers.

Example 20

At 40° C., with stirring, 10.4 parts of 1,2-propanediol is added to a mixture of 217.5 parts of diisopropylether and 75 parts of PACM comprised of 28% trans,trans, 60% cis,trans, 12% cis,cis isomers. Crystal nucleation begins as the temperature drops to 35° C. and is continued by holding at about 20° C. for 30 minutes. Simple filtration serves to separate 35 parts of wet cake from the accompanying mother liquor. Fractional distillation of each phase, individually, shows the crystal cake to contain PACM with an isomer distribution of 84% trans,trans, 14% cis,trans, 2% cis,cis isomers, and the filtrate to contain ether, propanediol, and 50 parts of PACM comprised of 7% trans,trans, 77% cis,trans, and 16% cis,cis isomers.

Example 21

At 40° C., with stirring, 10.5 parts of 2,3-butanediol is added to a mixture of 260 parts of toluene and 75 parts of a PACM comprised of 24% trans,trans, 61% cis,trans, and 13% cis,cis isomers and 2% 2,4'-bis(aminocyclohexyl)methane. Upon cooling, crystal nucleation begins at 33° C. and is continued by holding at 20° C. for 30 minutes prior to separation via filtration. 44.5 parts of wet cake containing 37% PACM via acid-base titration, is analyzed via gas-liquid partition chromatography to show the presence of PACM comprised of 75% trans,trans, 21% cis,trans, and 4% cis,cis isomer. The filtrate is distilled to yield toluene, butanediol, and 51 parts of a PACM comprised of 8% trans,trans, 74% cis,trans, and 15% cis,cis isomers, and about 3% 2,4'-bis(aminocyclohexyl)methane.

Example 22

At 45° C., with vigorous stirring, 6.7 parts of ethylene glycol is added to a mixture of 233 parts of cyclohexane and 75 parts of a PACM comprised of 24% trans,trans, 61% cis,trans, and 13% cis,cis isomers, and 2% 2,4'-bis(aminocyclohexyl)methane. The heterogeneous mixture shows nucleation and severe agglomeration of sticky solids at about 35° C. The mixture is held at 20° C. for 30 minutes before separation via filtration. The 34 parts of very soft crystal cake contains 65% PACM which is comprised of 60% trans,trans, 34% cis,trans, and 6% cis,cis isomers. The filtrate is distilled to give cyclohexane, ethylene glycol, and 41 parts of a PACM fraction comprised of 7% trans,trans, 77% cis,trans, and 16% cis,cis isomers.

Example 23

At 36° C. and with continuous stirring 16.2 parts of 2,3-butanediol is injected into a mixture of 195 parts of cyclohexane and 100 parts of a PACM comprised of 28% trans,trans, 60% cis,trans, and 12% cis,cis isomers. Upon cooling the homogeneous mixture, crystals begin to appear at 31° C. and the slurry is further cooled to 13° C. over a total of about 35 minutes. Separation via simple filtration results in 41 parts of a finely powdered crystal cake which is found by fractional distillation at reduced pressure to contain about 11.7 parts of cyclohexane, 9.5 parts 2,3-butanediol, and 20 parts of PACM comprised of 76% trans,trans, 21% cis,trans, and 3% cis,cis isomers. The filtrate was distilled to yield about 175 parts of cyclohexane, 7.4 parts of 2,3-butanediol and 82 parts of PACM comprised of 12% trans,trans, 73% cis,trans, and 15% cis,cis isomers.

Example 24

At 34° C. and with continuous agitation, 26 parts of 1,2-propanediol is added to a homogeneous mixture of 433 parts of toluene and 200 parts of a PACM comprised of 28% trans,trans, 58% cis,trans, and 12% cis,cis isomers, and containing 2% 2,4'-bis(aminocyclohexyl)methane. Nucleation requires less than 15 seconds and a minor temperature rise is experienced. The slurry is cooled to 15° C. over a period of about 35 minutes, and the phases are separated via simple filtration. 135 parts of wet cake is obtained after a rinse with 26 parts of toluene, and upon fractional distillation at reduced pressure is found to contain about 69 parts toluene, 14.6 parts propanediol, and 65 parts of a PACM fraction comprised of 76% trans,trans, 20% cis,trans, and 4% cis,cis isomers. The filtrate is similarly distilled to show the presence of about 394 parts toluene, 12.5 parts propanediol, and 137 parts of a PACM fraction comprised of 5% trans,trans, 84% cis,trans, and 8% cis,cis isomers, and 3% 2,4'-bis(aminocyclohexyl)methane.

Example 25

At 35° C., 15 parts of 1,2-butanediol is injected into a stirred mixture of 181 parts of diisopropyl ether and 100 parts of a PACM comprised of 8% trans,trans, 76% cis,trans, 15% cis,cis isomers, and 1% 2,4'-bis(aminocyclohexyl)methane. Nucleation and subsequent crystal growth occurs very slowly and the cooled slurry is held at about 9° C. for 45 minutes prior to simple filtration. The 19 parts of very soft, wet, "crystal cake" contains 38.5% PACM via acid-base titration, and gas-liquid partition chromatography shows this PACM to be comprised of 40% trans,trans, 51% cis,trans, and 9% cis,cis isomers. The filtrate is fractionated via distillation to yield diisopropyl ether, butanediol, and 91 parts of a PACM fraction comprised of 6% trans,trans, 78% cis,trans, and 15% cis,cis isomers, and about 1% 2,4'-bis(aminocyclohexyl)methane.

Example 26

At 42° C., 12 parts of 1,2-butanediol is injected into a stirred mixture of 303 parts of toluene and 75 parts of a PACM comprised of 28% trans,trans, 60% cis,trans, and 12% cis,cis isomers. Upon cooling, crystal formation begins at 36° C. and growth is enhanced by stirring the slurry for 30 minutes at 20° C., prior to simple filtration. 61 parts of wet crystal cake is found to contain 34.6% PACM comprised of 83% trans,trans, 14% cis,trans, and 3% cis,cis isomers. The filtrate is fractionated via vacuum distillation to yield 282 parts of toluene, 6 parts of butanediol, and 50 parts of PACM comprised of about 9% trans,trans, 75% cis,trans, and 16% cis,cis isomers.

Example 27

Into a stirred kettle is charged about 3700 parts of dibutyl ether, 147 parts of "commercial" ethylene glycol, and about 1334 parts of a PACM comprised of 28% trans,trans isomer in admixture with the cis,trans and cis,cis isomers, and the mixture is homogenized by heating to 60° C. The mixture is cooled to 22° C., with stirring, over a period of 4 hours and is then separated via gravity drainage of the kettle contents through a fine screen, into a liquid and a solid moiety having the volume ratio 2.62:1, when liquid. The crystal melt contains approximately 49% dibutyl ether, 10% glycol, and 41% PACM which is comprised of about 52% trans,trans PACM in admixture with the other isomers. The filtrate contains ether, glycol, and a PACM which contains about 8% trans,trans in admixture with the other isomers.

Example 28

At 25° C., 11.1 parts of 2-mercaptoethanol is added to a stirred mixture of 117.5 parts of acetonitrile and 50 parts of a PACM comprised of approximately 28% trans,trans, 60% cis,trans, and 12% cis,cis isomers. Nucleation is quite slow and the mixture is stirred, cooled, and is held at 9° C. for about 50 minutes prior to separation of the crystalline solid from the supporting liquid via simple filtration. Upon transfer a 20 part rinse of acetonitrile is used. 43 parts of wet cake analyze 37.6% PACM comprised of 51% trans,trans, 42% cis,trans, and 7% cis,cis isomers. The PACM moiety within the filtrate is comprised of 24% trans,trans, 62% cis,trans, and 14% cis,cis isomers.

Example 29

At 25° C., with agitation, 1 part of 1,2-propane-diol is added to a mixture of 15 parts of diisopropyl ether and 5 parts of a PACM containing 37% cis,cis isomer and 59% cis,trans isomer. The mixture is cooled to about 15° C. and is stirred for one hour. After one hour the small volume of fine white crystals are recovered by simple filtration and are found to be PACM-propanediolate with the PACM being composed of 83% cis,cis isomer and 17% cis,trans isomer.

Example 30

Into a large flask equipped with heater and stirrer are weighed 3609 parts of isopropyl ether, 1200 parts of a mixture of isomers of PACM containing 48.5% of the trans,-trans isomer, and 195 parts of propylene glycol, which is an amount calculated to equal a 10% molar excess on a mol for mol basis with respect to the trans,trans isomer present. The flask is heated with stirring until the precipitated polyolate has dissolved at about 60° C.

The clear solution is slowly and continuously fed into a crystallizing vessel equipped with a hollow draft tube, through which cooling water is circulated, and an impeller. Upon cooling, the trans,trans PACM-glycolate crystallizes out to form a heavy though easily recirculated suspension. The suspension is maintained at a temperature of 20.5 to 21.5° C. After the overflow level is reached, the crystal suspension continuously overflows into receiving vessels.

A typical sample of 614 parts of the overflowing suspension is filtered to give 95 parts of a damp cake. This cake is charged to a vacuum still and the following fractions are obtained by vacuum distillation.

Cut 1—ether, negligible quantity.
Cut 2—propylene glycol, 19.7 parts.
Cut 3—PACM, 62.0 parts.
Residue—unidentified, 4.1 parts.

Cut 3 analyzes 84.75% trans,trans PACM. The recovery of trans,trans isomer in the cake is calculated to be 73.5%.

A sample of the mother liquor from the above filtration is distilled, and the PACM portion is found to contain 18.5% of the trans,trans isomer.

I claim:

1. The polyolate co-ordination compound formed by admixing at a temperature between —25 and 100° C. bis(p-aminocyclohexyl)methane and an aliphatic polyol containing from 2 through 14 carbon atoms and from 2 through 4 —XH groups where X is a chalcogen of atomic number less than 34.

2. The polyolate co-ordination compound formed by admixing at a temperature between —25 and 100° C. the trans,trans isomer of bis(p-aminocyclohexyl)methane and an aliphatic polyol containing from 2 through 14 carbon atoms and from 2 through 4 —XH groups where X is a chalcogen of atomic number less than 34.

3. The polyolate co-ordination compound formed by admixing at a temperature between —25 and 100° C. the cis,cis isomer of bis(p-aminocyclohexyl)methane and an aliphatic polyol containing from 2 through 14 carbon atoms and from 2 through 4 —XH groups where X is a chalcogen of atomic number less than 34.

4. The polyolate co-ordination compound formed by admixing at a temperature between —25 and 100° C. the cis,trans isomer of bis(p-aminocyclohexyl)methane and an aliphatic polyol containing from 2 through 14 carbon atoms and from 2 through 4 —XH groups where X is a chalcogen of atomic number less than 34.

5. The polyolate co-ordination compound formed by admixing at a temperature between —25 and 100° C. bis(p-aminocyclohexyl)methane and an aliphatic polyol selected from the group consisting of 1,4-butanediol, 3-methoxy propanediol-1,2, 1,2 - pentanediol, 2,3-pentanediol, 2,3-octanediol, 3,4 - octanediol, 4,5 - octanediol, ethanediol, 1,2 - propanediol, 1,2-butanediol, and 2,3-butanediol.

6. The polyolate co-ordination compound formed by admixing at a temperature between —25 and 100° C. the trans,trans isomer of bis(p-aminocyclohexyl)methane and an aliphatic polyol selected from the group consisting of 1,4 - butanediol, 3 - methoxy propanediol-1,2, 1,2-pentanediol, 2,3-pentanediol, 2,3 - octanediol, 3,4-octanediol, 4,5 - octanediol, ethanediol, 1,2 - propanediol, 1,2-butanediol, and 2,3-butanediol.

7. The polyolate co-ordination compound formed by admixing at a temperature between —25 and 100° C. bis(p-aminocyclohexyl)methane and ethanediol.

8. The polyolate co-ordination compound formed by admixing at a temperature between —25 and 100° C. bis(p-aminocyclohexyl)methane and 1,2-propanediol.

9. The polyolate co-ordination compound formed by admixing at a temperature between —25 and 100° C. bis(p-aminocyclohexyl)methane and 1,2-butanediol.

10. The polyolate co-ordination compound formed by admixing at a temperature between —25 and 100° C. bis(p-aminocyclohexyl)methane and 2,3-butanediol.

11. The polyolate co-ordination compound formed by admixing at a temperature between —25 and 100° C. the trans,trans isomer of bis(p-aminocyclohexyl)methane and ethanediol.

12. The polyolate co-ordination compound formed by admixing at a temperature between —25 and 100° C. the trans,trans isomer of bis(p-aminocyclohexyl)methane and 1,2-propanediol.

13. The polyolate co-ordination compound formed by admixing at a temperature between —25 and 100° C. the trans,trans isomer of bis(p-aminocyclohexyl)methane and 1,2-butanediol.

14. The polyolate co-ordination compound formed by admixing at a temperature between —25 and 100° C. the trans,trans isomer of bis(p-aminocyclohexyl)methane and 2,3-butanediol.

15. The process of admixing a polyol compound contatining two through four —XH groups with a mixture of PACM stereoisomers and separating by physical means the two phases that result, where X is a chalcogen of atomic number less than 34 and with the limitation that the reacting —XH groups of the polyol are on aliphatic carbon atoms.

16. The process of claim 15 conducted in the presence of an inert organic diluent, said diluent being one in which the reactants are soluble and from which the polyolate reaction product is readily separable.

17. The process of claim 15 conducted in the presence of a diluent selected from the group consisting of di-n-propyl ether, diallyl ether, benzene, xylene, n-hexane, cyclooctane, 1,2-diethoxyethane, tributylamine, di-n-butyl ether, diisopropyl ether, cyclohexane and toluene.

18. The process of claim 16 in which the polyol compound is ethanediol and the diluent is diisopropyl ether.

19. The process of claim 16 in which the polyol compound is 1,2-propanediol and the diluent is di-n-butyl ether.

20. The process of claim 16 in which the polyol compound is 1,2-butanediol and the diluent is cyclohexane.

21. The process of claim 16 in which the polyol compound is 2,3-butanediol and the diluent is toluene.

22. The process of claim 16 in which the polyol compound is ethanediol and the diluent is di-n-butyl ether.

23. The process of claim 16 in which the polyol compound is ethanediol and the diluent is cyclohexane.

24. The process of claim 16 in which the polyol compound is ethanediol and the diluent is toluene.

25. The process of claim 16 in which the polyol compound is 1,2-propanediol and the diluent is diisopropyl ether.

26. The process of claim 16 in which the polyol compound is 1,2-propanediol and the diluent is cyclohexane.

27. The process of claim 16 in which the polyol compound is 1,2-propanediol and the diluent is toluene.

28. The process of claim 16 in which the polyol compound is 1,2-butanediol and the diluent is diisopropyl ether.

29. The process of claim 16 in which the polyol compound is 1,2-butanediol and the diluent is di-n-butyl ether.

30. The process of claim 16 in which the polyol compounds is 1,2-butanediol and the diluent is toluene.

31. The process of claim 16 in which the polyol compound is 2,3-butanediol and the diluent is diisopropyl ether.

32. The process of claim 16 in which the polyol compound is 2,3-butanediol and the diluent is di-n-butyl ether.

33. The process of claim 16 in which the polyol compound is 2,3-butanediol and the diluent is cyclohexane.

References Cited

UNITED STATES PATENTS 2,268,467  12/1941  Ashworth _____ 260—563

FOREIGN PATENTS 525,172  8/1940  Great Britain.

CHARLES B. PARKER, *Primary Examiner.*

P. C. IVES, *Assistant Examiner.*